United States Patent
Manabe et al.

(10) Patent No.: US 10,225,429 B1
(45) Date of Patent: Mar. 5, 2019

(54) INFORMATION PROCESSING SYSTEM, INFORMATION PROCESSING APPARATUS, AND INFORMATION TERMINAL DEVICE

(71) Applicant: KYOCERA DOCUMENT SOLUTIONS INC., Osaka (JP)

(72) Inventors: Hiroshi Manabe, Concord, CA (US); Gin Yoshidome, Concord, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/851,764

(22) Filed: Dec. 22, 2017

(51) Int. Cl.
- *H04N 1/21* (2006.01)
- *H04N 1/00* (2006.01)
- *H04N 1/44* (2006.01)

(52) U.S. Cl.
CPC ....... *H04N 1/2179* (2013.01); *H04N 1/00244* (2013.01); *H04N 1/00307* (2013.01); *H04N 1/00408* (2013.01); *H04N 1/4433* (2013.01); *H04N 2201/0094* (2013.01)

(58) Field of Classification Search
CPC .................................................. H04N 1/2179
USPC ......................................................... 358/1.15
See application file for complete search history.

(56) References Cited

U.S. PATENT DOCUMENTS

2015/0154484 A1 *  6/2015  Iwasaki .............. G06K 15/4095
                                              358/1.14
2016/0227073 A1 *  8/2016  Omori .................. H04N 1/4426

FOREIGN PATENT DOCUMENTS

JP    2015-108925 A    6/2015

* cited by examiner

*Primary Examiner* — Jacky X Zheng
(74) *Attorney, Agent, or Firm* — Li & Cai Intellectual Property (USA) Office (57) ABSTRACT

An information processing apparatus is configured to receive the identification information items of the one or more destinations from an information terminal device via the first communication interface, the information terminal device storing addresses and identification information items of one or more destinations in association with each other, the one or more destinations being selectable as a data-transmission-destination, select an identification information item of a destination, to which data is to be transmitted, out of the received identification information items of the one or more destinations, and transmit the selected identification information item of the destination and the data to the information terminal device via the first communication interface.

9 Claims, 6 Drawing Sheets

INFORMATION PROCESSING SYSTEM, INFORMATION PROCESSING APPARATUS, AND INFORMATION TERMINAL DEVICE

BACKGROUND OF THE INVENTION

1. Field of the Invention

The present disclosure relates to an information processing apparatus configured to transmit data to email servers or storages in a cloud, a information terminal device configured to communicate with the information processing apparatus, and an information processing system including the information processing apparatus and the information terminal device.

2. Description of Related Art

There is known an information processing apparatus configured to transmit data to email servers or storages in a cloud.

SUMMARY OF THE INVENTION

According to an embodiment of the present disclosure, there is provided an information processing system, including:
  an information processing apparatus; and
  an information terminal device,
  the information processing apparatus including
  a first memory that stores a first information processing program,
  a first processor configured to execute the first information processing program, and
  a first communication interface configured to communicate with the information terminal device,
  the information terminal device including
  a second memory that stores a second information processing program,
  a third memory that stores addresses and identification information items of one or more destinations in association with each other, the one or more destinations being selectable as a data-transmission-destination,
  a second processor configured to execute the second information processing program, and
  a second communication interface configured to communicate with the information processing apparatus, in which
  the second processor of the information terminal device is, when the second processor of the information terminal device executes the second information processing program, configured to
    transmit the identification information items of the one or more destinations stored in the third memory to the information processing apparatus via the second communication interface,
  the first processor of the information processing apparatus is, when the first processor of the information processing apparatus executes the first information processing program, configured to
    receive the identification information items of the one or more destinations from the information terminal device via the first communication interface,
    select an identification information item of a destination, to which data is to be transmitted, out of the received identification information items of the one or more destinations, and
    transmit the selected identification information item of the destination and the data to the information terminal device via the first communication interface, and
  the second processor of the information terminal device is, when the second processor of the information terminal device executes the second information processing program, further configured to
    receive the identification information item of the destination and the data from the information processing apparatus via the second communication interface, and
    transmit the data to an address of the destination stored in the third memory in association with the received identification information item via the second communication interface.

According to an embodiment of the present disclosure, there is provided an information processing apparatus, including:
  a first memory that stores a first information processing program;
  a first processor configured to execute the first information processing program; and
  a first communication interface configured to communicate with the information terminal device, in which
  the first processor is, when the first processor executes the first information processing program, configured to
    receive the identification information items of the one or more destinations from an information terminal device via the first communication interface, the information terminal device storing addresses and identification information items of one or more destinations in association with each other, the one or more destinations being selectable as a data-transmission-destination,
    select an identification information item of a destination, to which data is to be transmitted, out of the received identification information items of the one or more destinations, and
    transmit the selected identification information item of the destination and the data to the information terminal device via the first communication interface.

According to an embodiment of the present disclosure, there is provided an information terminal device, including:
  a second memory that stores a second information processing program;
  a third memory that stores addresses and identification information items of one or more destinations in association with each other, the one or more destinations being selectable as a data-transmission-destination;
  a second processor configured to execute the second information processing program; and
  a second communication interface configured to communicate with the information processing apparatus, in which
  the second processor is, when the second processor executes the second information processing program, configured to
    transmit the identification information items of the one or more destinations stored in the third memory to the information processing apparatus via the second communication interface,
    receive the identification information item of the destination selected by the information processing apparatus and the data from the information processing apparatus via the second communication interface, and
    transmit the data to an address of the destination stored in the third memory in association with the received identification information item via the second communication interface.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Information Processing System

Figure 1:
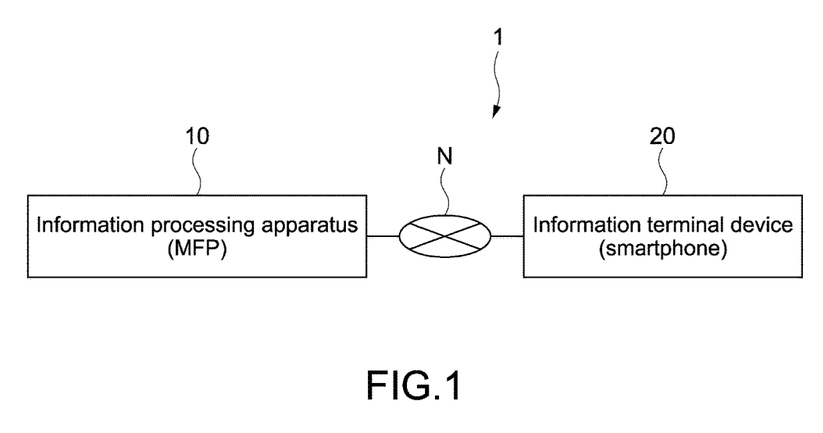
FIG. 1 shows an information processing system of an embodiment of the present disclosure.

FIG. 1 shows an information processing system of an embodiment of the present disclosure.

The information processing system 1 includes the information processing apparatus 10 and the information terminal device 20.

In the present embodiment, the information processing apparatus 10 is an MFP (Multifunction Peripheral) and will be referred to as the MFP 10 hereinafter. The MFP 10 is in an office, typically.

The information terminal device 20 is typically a mobile device and more specifically a smartphone having an IMEI (International Mobile Equipment Identity), and will be referred to as the smartphone 20 hereinafter. Typically, the owner of the smartphone 20 is a person in the office in which the MFP 10 is installed.

The MFP 10 is configured to communicate with the smartphone 20 via the network N such as the Internet and a LAN (Local Area Network) on the basis of HTTPS (Hypertext Transfer Protocol Secure). Email servers or storages in a cloud (not shown) are also connected to the network N. The MFP 10 is further configured to communicate with the smartphone 20 via at least one of the protocols including NFC (Near Field Communication), Wi-Fi (registered trademark) Direct, and Bluetooth (registered trademark).

2. Hardware Configuration of MFP

Figure 2:
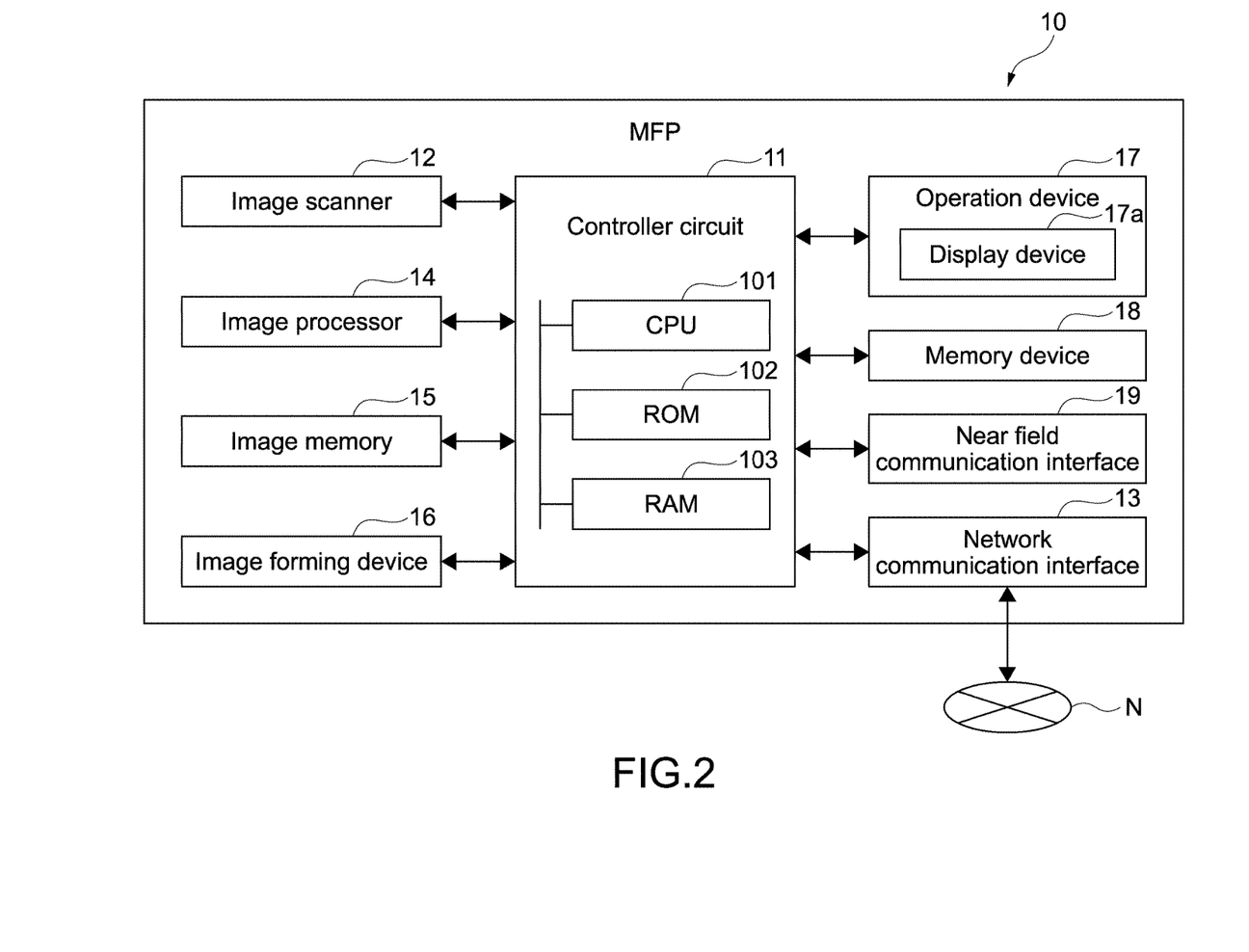
FIG. 2 shows a hardware configuration of an MFP.

FIG. 2 shows a hardware configuration of the MFP.

The MFP 10 includes a controller circuit 11. The controller circuit 11 includes a CPU (Central Processing Unit) 101 (first processor), a ROM (Read Only Memory) 102 (first memory), a RAM (Random Access Memory) 103, dedicated hardware circuits, and the like and controls overall operations of the MFP 10. An information processing program (first information processing program) that causes the MFP 10 to operate as the respective functional units (to be described later) is stored in a non-transitory computer readable recording medium such as the ROM 102.

The controller circuit 11 is connected to an image scanner 12, an image processor 14, an image memory 15, an image forming device 16, an operation device 17, a memory device 18, a network communication interface 13 (first communication interface), the near field communication interface 19, and the like. The controller circuit 11 performs operational control of the respective devices connected thereto and sends/receives signals and data to/from those devices.

According to job execution instructions input by a user via the operation device 17 or a personal computer (not shown) connected to a network N, the controller circuit 11 controls drive and processing of mechanisms requisite for executing operational control of functions such as an image scanner function, a printing function, and a copy function.

The image scanner 12 captures an image of a document.

The image processor 14 carries out image processing as necessary on image data of an image captured by the image scanner 12. For example, the image processor 14 corrects shading of an image captured by the image scanner 12 and carries out other image processing to improve the quality of the image to be formed.

The image memory 15 includes an area that temporarily stores data of a document image captured by the image scanner 12 or data to be printed by the image forming device 16.

The image forming device 16 forms an image of image data and the like captured by the image scanner 12.

The operation device 17 includes a touch panel device and an operation key device that accept user's instructions on various operations and processing executable by the MFP 10. The touch panel device includes a display device 17a such as an LCD (Liquid Crystal Display) equipped with a touch panel.

The network communication interface 13 is an interface used for connecting to the network N via HTTPS communication.

The memory device 18 is a large-volume storage device such as an HDD (Hard Disk Drive) that stores a document image captured by the image scanner 12, and the like.

The near field communication interface 19 is configured to communicate with the smartphone 20 via at least one of the protocols including NFC (Near Field Communication), Wi-Fi (registered trademark) Direct, and Bluetooth (registered trademark).

3. Hardware Configuration of Smartphone

Figure 3:
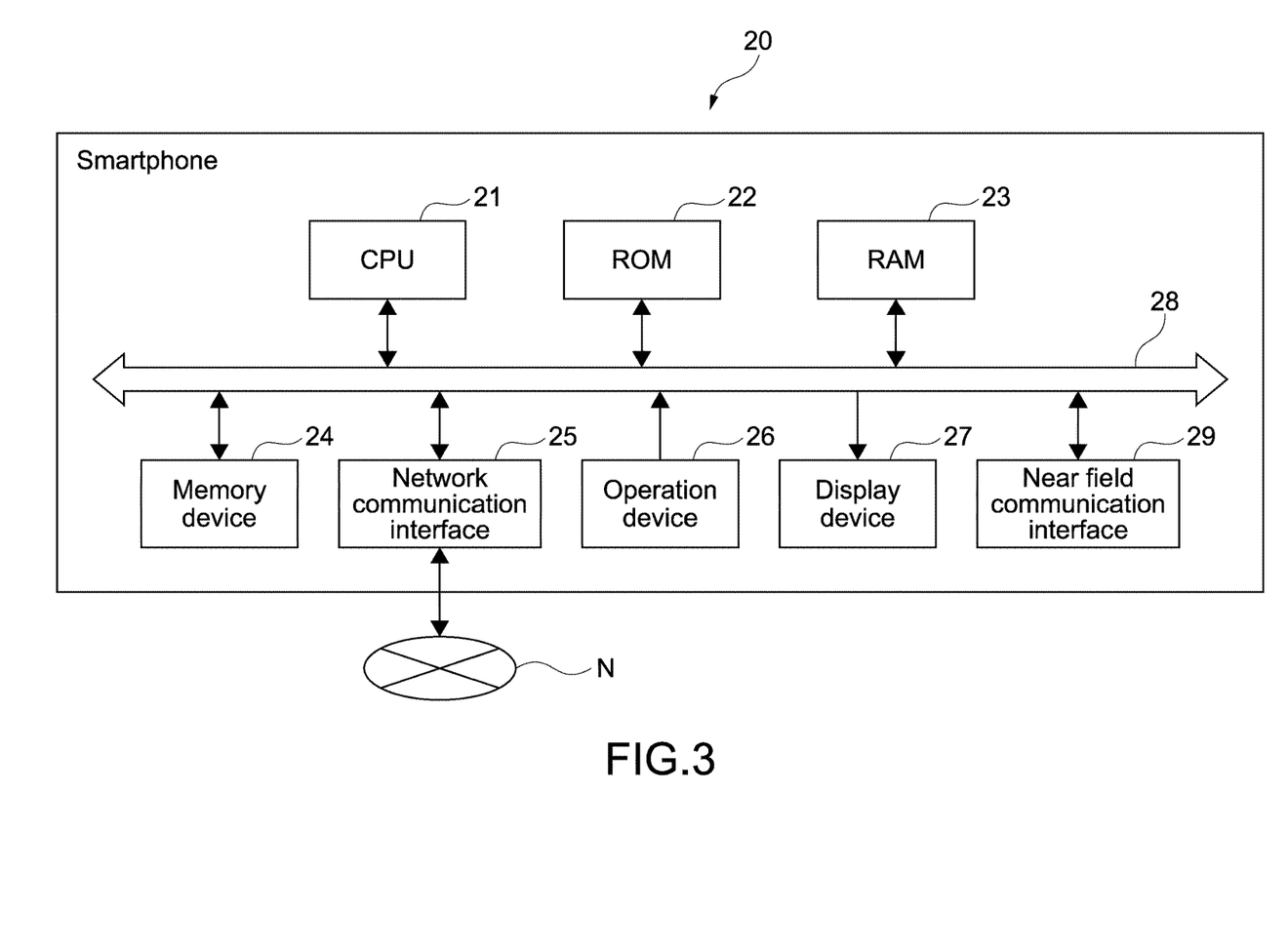
FIG. 3 shows hardware configuration of a smartphone.

FIG. 3 shows hardware configuration of a smartphone.

The smartphone 20 includes the CPU (Central Processing Unit) 21 (processor), the ROM (Read Only Memory) 22, the RAM (Random Access Memory) 23, the memory device 24 (memory), the network communication interface 25 (second communication interface), the operation devices 26, the display device 27, and the near field communication interface 29. The smartphone 20 further includes the bus 28 connecting them.

The CPU 21 (second processor) loads information processing programs, which are stored in the ROM 22 (second memory), in the RAM 23 and executes the information processing programs. The ROM 22 is a nonvolatile memory, and stores the programs that the CPU 21 executes, data, and the like. The ROM 22 is an example of a non-transitory computer readable recording medium.

The memory devices 24 (third memory) include a large-volume storage medium such as an HDD (Hard Disk Drive) and an SSD (Solid State Drive) and an external storage medium such as a USB (Universal Serial Bus) memory.

The communication interface 25 is an interface configured to connect to the network N. The network communication interface 25 is configured to communicate with the MFP 10 and email servers or storages in a cloud (not shown) via the network N on the basis of HTTPS.

The operation devices 26 include a touchpad and various switches. The operation devices 26 detect operations input by a user and output signals based on the detected operations to the CPU 21.

The display device 27 of the touchpad includes an LCD, an organic EL display, or the like. The display device 17 executes calculation processing on the basis of information received from the CPU 21, and displays images on the display on the basis of generated image signals.

The near field communication interface 29 is configured to communicate with the MFP 10 via at least one of the protocols including NFC (Near Field Communication), Wi-Fi (registered trademark) Direct, and Bluetooth (registered trademark).

4. Functional Configuration of Information Processing System

Figure 4:
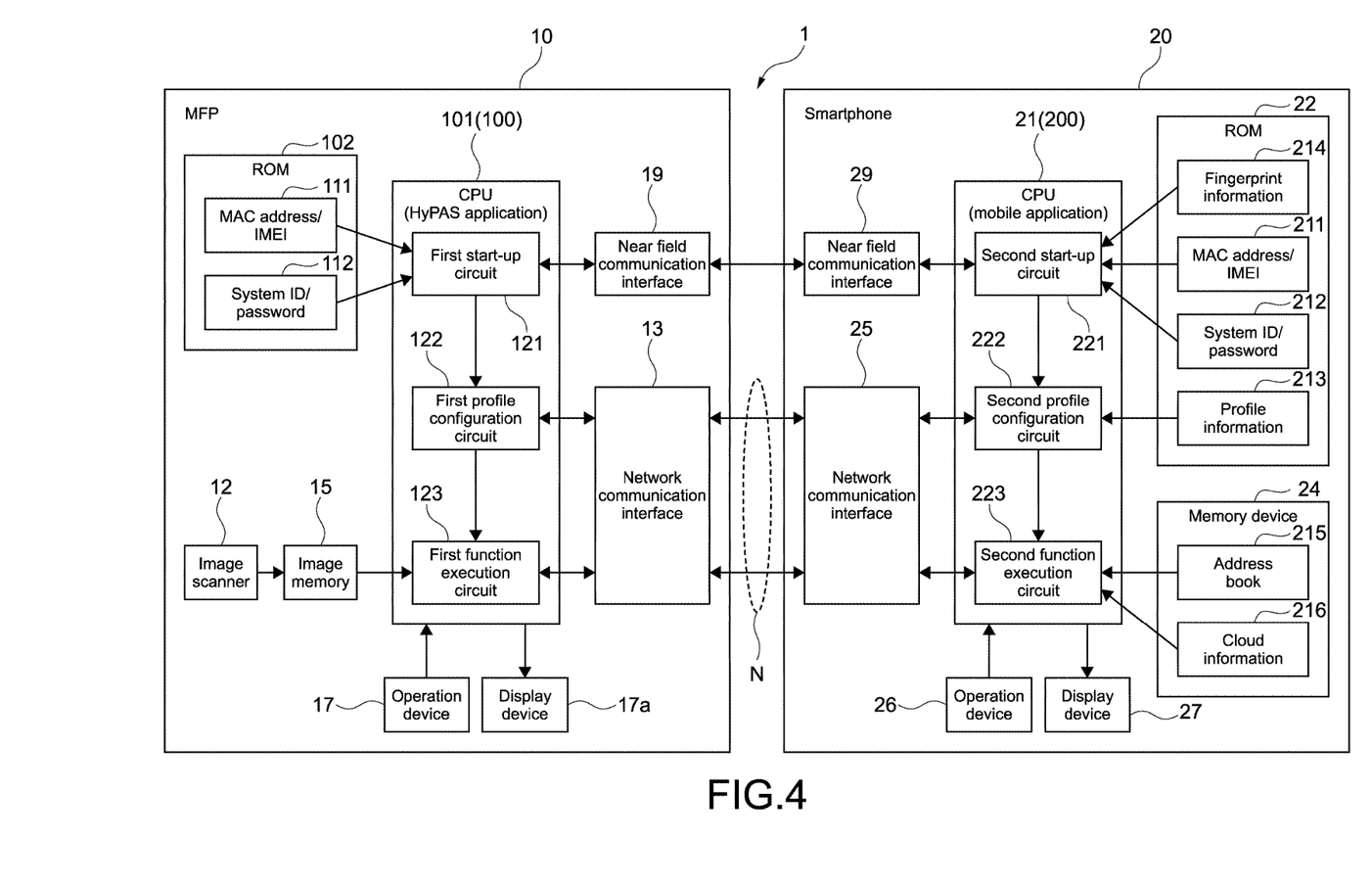
FIG. 4 shows a functional configuration of the information processing system.

FIG. 4 shows a functional configuration of the information processing system.

The CPU 101 (first processor) of the MFP 10 loads the information processing program (first information processing program) 100, which is stored in the ROM 102 (first memory), in the RAM 103, and executes the information processing program 100. When the CPU 101 of the MFP 10 executes the information processing program 100, the CPU 101 of the MFP 10 operates as the first start-up circuit 121, the first profile configuration circuit 122, and the first function execution circuit 123. The first information processing program 100 is an application program executable under a certain platform (for example, HyPAS (Hybrid Platform for Advanced Solutions)) environment of the MFP 10, and will be referred to as "HyPAS application 100" hereinafter.

The CPU 21 (second processor) of the smartphone 20 loads the information processing program (second information processing program) 200, which is stored in the ROM 22 (second memory), in the RAM 23, and executes the information processing program 200. When the CPU 21 of the smartphone 20 executes the information processing program 200, the CPU 21 of the smartphone 20 operates as the second start-up circuit 221, the second profile configuration circuit 222, and the second function execution circuit 223. The second information processing program 200 is an application program executable in cooperation with the HyPAS application 100, and will be referred to as "mobile application 200" hereinafter.

The second start-up circuit 221 of the smartphone 20 transmits the MAC (Media Access Control address) address/IMEI 211 of the smartphone 20 and the system ID/password 212 of the MFP 10 to the MFP 10.

The first start-up circuit 121 of the MFP 10 authenticates the smartphone 20 on the basis of the MAC address/IMEI 211 and the system ID/password 212 received from the smartphone 20.

The second profile configuration circuit 222 of the smartphone 20 transmits the profile information 213 to the MFP 10.

The first profile configuration circuit 122 of the MFP 10 displays a GUI (Graphical User Interface) on the display device 17a of the MFP 10 depending on the profile information 213 received from the smartphone 20.

When the first function execution circuit 123 of the MFP 10 transmits scanned data via email, the first function execution circuit 123 transmits a destination request, which requests for information about destinations selectable as a scanned-data-transmission-destination, to the smartphone 20.

The second function execution circuit 223 of the smartphone 20 transmits destination identification information items registered on the address book 215 to the MFP 10.

The first function execution circuit 123 of the MFP 10 transmits a destination identification information item, which is selected out of the destination identification information items received from the smartphone 20, and the scanned data, which is to be transmitted to the destination, to the smartphone 20.

The second function execution circuit 223 of the smartphone 20 receives the destination identification information item and the scanned data, which is to be transmitted to the destination, from the MFP 10. The second function execution circuit 223 transmits the scanned data received from the MFP 10 to the destination, i.e., the email address registered on the address book 215 in association with the received destination identification information item.

The information stored in the ROM 102 of the MFP 10, the information stored in the ROM 22 of the smartphone 20, and the information stored in the memory device 24 of the smartphone 20 are as follows.

The ROM 102 (first memory) of the MFP 10 stores, as the default configuration information used to execute the HyPAS application 100, the MAC address/IMEI 111 of the smartphone 20 and the system ID/password 112 of the MFP 10. A user, i.e., an IT manager person (manager person in the office, serviceman, etc.), may manually register the default configuration information on the MFP 10.

The ROM 22 (second memory) of the smartphone 20 at least stores, as the default configuration information used to execute the mobile application 200, the system ID/password 212 (same as the system ID/password 112) of the MFP 10. The ROM 22 of the smartphone 20 further stores, as the default configuration information, the profile information 213 of the MFP 10 as necessary. Specifically, the profile information 213 of the MFP 10 includes information about the language and the start-up window to be displayed on the touch panel device of the MFP 10, about bookmark configuration of functions of the MFP 10, and the like. Typically, a user, i.e., an end user (person in the office, etc.) who is the owner of the smartphone 20, has manually registered the default configuration information on the smartphone 20.

The ROM 22 of the smartphone 20 stores the MAC address/IMEI 211 of the smartphone 20, and information used to authenticate the user who uses the smartphone 20 (for example, fingerprint information 214).

The memory device 24 (third memory) of the smartphone 20 stores the address book 215 and the cloud information 216. The "address book" records email addresses and destination identification information items (names, etc.), each of which identifies the destination of each email address, in association with each other. The "cloud information" records URLs (Uniform Resource Locators) used to access storages in a cloud (Google Drive (registered trademark), OneDrive (registered trademark), and Evernote (registered trademark), etc.) and destination identification information items (names of storage services, etc.), each of which identifies each storage, in association with each other. Typically, the address book 215 and the cloud information 216 contain information about destinations that a user uses privately, the user being an end user (person in the office, etc.) who is the owner of the smartphone 20.

5. Operation of Information Processing System

Figure 5:
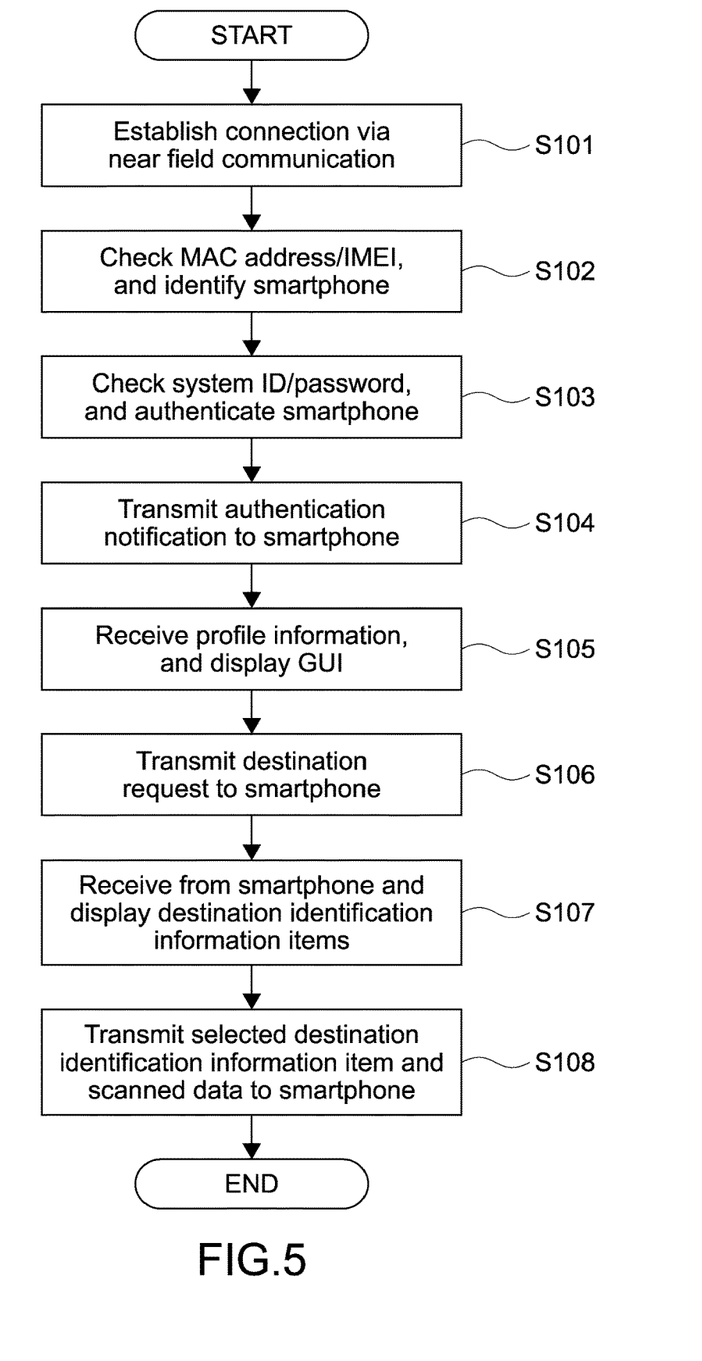
FIG. 5 shows an operational flow of the MFP.
Figure 6:
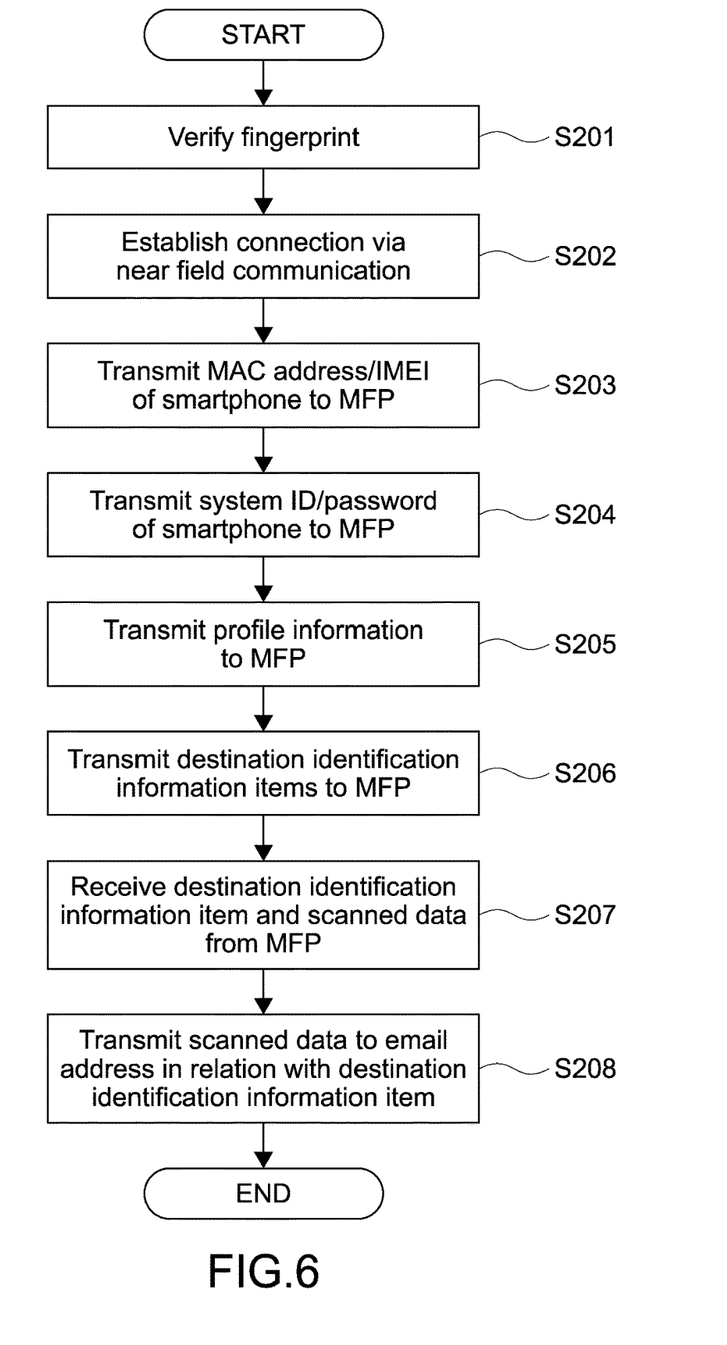
FIG. 6 shows an operational flow of the smartphone.

FIG. 5 shows an operational flow of the MFP. FIG. 6 shows an operational flow of the smartphone.

The second start-up circuit 221 of the smartphone 20 detects a predetermined operation input in the touchpad by a user, captures his fingerprint, and checks the captured fingerprint against the fingerprint information 214 stored in the ROM 22 (Step S201).

Where the second start-up circuit 221 of the smartphone 20 verifies the fingerprint, the second start-up circuit 221 establishes connection with the near field communication interface 19 of the MFP 10 via at least one of the protocols including NFC (Near Field Communication), Wi-Fi (registered trademark) Direct, and Bluetooth (registered trademark) (Step S202). The second start-up circuit 221 of the smartphone 20 transmits the MAC address/IMEI 211 of the smartphone 20 to the MFP 10, with which connection via the near field communication is established (Step S203).

The first start-up circuit 121 of the MFP 10 receives the MAC address/IMEI 211 of the smartphone 20, with which connection via the near field communication is established (Step S101). The first start-up circuit 121 checks the received MAC address/IMEI 211 against the MAC address/IMEI 111 stored in the ROM 102, and identifies the smartphone 20 (Step S102). The first start-up circuit 121 notifies the smartphone 20 that the smartphone 20 is identified.

The second start-up circuit 221 of the smartphone 20 retrieves the system ID/password 212 of the MFP 10 from the ROM 22, and transmits the system ID/password 212 to the MFP 10 via the near field communication interface 29 (Step S204).

The first start-up circuit 121 of the MFP 10 receives the system ID/password 212 from the smartphone 20 via the near field communication interface 29. The first start-up circuit 121 checks the received system ID/password 212 against the system ID/password 112 stored in the ROM 102. Where the received system ID/password 212 matches the system ID/password 112, the first start-up circuit 121 authenticates the smartphone 20 (Step S103). In other words, the first start-up circuit 121 authenticates the smartphone 20 under the condition that the MAC address/IMEI 211 received from the smartphone 20 matches the MAC address/IMEI 111 stored in the ROM 102 (Step S102) and that the system ID/password 212 received from the smartphone 20 matches the system ID/password 112 stored in the ROM 102 (Step S103). The first start-up circuit 121 transmits authentication notification to the smartphone 20 via the near field communication interface 19 (Step S104).

The second start-up circuit 221 of the smartphone 20 receives the authentication notification from the MFP 10 via the near field communication interface 29. Then the second profile configuration circuit 222 retrieves the profile information 213 (information about the language and the start-up window to be displayed on the touch panel device of the MFP 10, about bookmark configuration of functions of the MFP 10, and the like) from the ROM 22. The second profile configuration circuit 222 transmits the profile information 213 to the MFP 10 via the network communication interface 25 (Step S205).

The first profile configuration circuit 122 of the MFP 10 receives the profile information 213 from the smartphone 20 via the network communication interface 13. The first profile configuration circuit 122 displays a GUI on the display device 17a of the MFP 10 depending on the received profile information 213 (Step S105). The GUI is used to select functional operations of the MFP 10 (scan, copy, print, transmission of scanned data via email, transmission of scanned data to storage in a cloud, etc.).

The first function execution circuit 123 of the MFP 10 detects a certain operation input in the operation device 17 as selection of a certain functional operation. In the present embodiment, the first function execution circuit 123 detects "transmission of scanned data via email". The first function execution circuit 123 retrieves data scanned by the image scanner 12 and stored in the image memory 15. The first function execution circuit 123 transmits a destination request, which requests for information about destinations selectable as a scanned-data-transmission-destination, to the smartphone 20 via the network communication interface 13 (Step S106).

The second function execution circuit 223 of the smartphone 20 receives the destination request from the MFP 10 via the network communication interface 25. The second function execution circuit 223 retrieves the destination identification information items registered on the address book 215 from the memory device 24. The second function execution circuit 223 transmits the retrieved destination identification information items to the MFP 10 via the network communication interface 25 (Step S206). Note that the second function execution circuit 223 transmits no email address to the MFP 10. Instead, the second function execution circuit 223 only transmits the destination identification information items (names, etc.), each of which identifies the destination of each email address, to the MFP 10.

The first function execution circuit 123 of the MFP 10 receives the destination identification information items (names, etc.), each of which identifies each destination, from the smartphone 20 via the network communication interface 13. The first function execution circuit 123 displays the received destination identification information items (names, etc.) on the display device 17a (Step S107). The first function execution circuit 123 detects a certain operation input in the operation device 17 as selection of a certain destination identification information item (name, etc.). The first function execution circuit 123 transmits the selected destination identification information item (metadata) and the scanned data to be transmitted to the destination to the smartphone 20 via the network communication interface 13 (Step S108).

The second function execution circuit 223 of the smartphone 20 receives the destination identification information item and the scanned data to be transmitted to the destination from the MFP 10 via the network communication interface 25 (Step S207). The second function execution circuit 223 retrieves the email address, which is registered on the address book 215 in association with the received destination identification information item, from the memory device 24. The second function execution circuit 223 transmits the scanned data received from the MFP 10 to the destination, i.e., the retrieved email address, via the network communication interface 25 (Step S208).

6. Modification Example

In the above-mentioned example, the first function execution circuit 123 executes "transmission of scanned data via email". The same applies to transmission of scanned data to a storage in a cloud.

In short, the second function execution circuit 223 of the smartphone 20 transmits no URL registered on the cloud information 216 to the MFP 10. The second function execution circuit 223 only transmits the destination identification information items (names of storage services, etc.), each of which identifies the destination of each storage, to the MFP 10 (Step S206).

The first function execution circuit 123 of the MFP 10 transmits the selected destination identification information item (name of storage service, etc.) and the scanned data to be transmitted to the destination to the smartphone 20 via the network communication interface 13 (Step S108).

The second function execution circuit 223 of the smartphone 20 transmits the scanned data received from the MFP 10 to the destination, i.e., the URL registered on the cloud information 216 in the memory device 24 in association with the destination identification information item received from the MFP 10, via the network communication interface 25 (Step S208).

The same applies to transmission of scanned data via FAX, in addition to transmission of scanned data via email and transmission of scanned data to storage in a cloud.

7. Conclusion

It is desirable to increase user-friendliness of the technique of transmitting data to email servers or storages in a cloud.

Firstly, in many cases, an MFP or a printer authenticates a user when he wishes to use the device. The user has to input the user's name and a password in a touch panel of the device. Especially, not an MFP but a low-spec printer only has a minimum number of buttons, and it thus takes trouble to input such information. To improve user-friendliness, according to a conceivable method, an MFP or a printer is equipped with an ID-card reader and authenticates users on the basis of the ID-card data read by the ID-card reader, where all the users (workers) have ID cards. However, according to this method, it is necessary to purchase a card reader and to prepare and manage the ID cards. It is difficult for small firms to employ this method.

To the contrary, according to the present embodiment, the first start-up circuit 121 and the second start-up circuit 221 authenticate a user logging in to the MFP 10 by using the smartphone 20 that the user owns.

Secondly, frequently-used functions and preferred touch panel windows are different depending on users. Typically, an IT manager person manages profile information of each user, and configures the profile information of each user in each MFP/printer individually.

To the contrary, according to the first profile configuration circuit 122 and the second profile configuration circuit 222 of the present embodiment, the mobile application 200 of the smartphone 20 presets profile information of each user, which is input by each user, and the mobile application 200 of the smartphone 20 provides the profile information of each user to the MFP 10 when the smartphone 20 logs in to the MFP 10. Therefore it is not necessary to preset profile information of each user in the MFP 10 (or MFPs 10). It is not necessary for an IT manager person to manage profile information of each user. In addition, the smartphone 20 may change configuration of the owner's profile information anytime.

Thirdly, typically, an MFP, which is configured to transmit data to email servers or storages in a cloud, has to record the email addresses and URLs used to access the storages in the cloud. Therefore, typically, an IT manager person has to preset the email addresses and URLs used to access the storages in the cloud in all the printers. In addition, data is only transmitted to certain email addresses and cloud storages (i.e., email addresses and URLs of cloud storages recorded in MFP). It is not possible to directly transmit data to a private cloud storage, for example.

To the contrary, according to the first function execution circuit 123 and the second function execution circuit 223 of the present embodiment, the smartphone 20 is configured to access the address book 215 and the cloud information 216. Scanned document data or the like is transmitted via the second function execution circuit 223 of the smartphone 20. Therefore it is not necessary for the MFP 10 to store the address book 215 and the cloud information 216, and the MFP 10 transmits data on the basis of the address book 215 of the smartphone 20. In addition, since the MFP 10 does not store the address book 215 and the cloud information 216, even if the MFP 10 is at a public location, there is no security problem such as leak of private information, for example.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing system, comprising:
an information processing apparatus; and
an information terminal device,
the information processing apparatus including
a first memory that stores a first information processing program,
a first processor configured to execute the first information processing program, and
a first communication interface configured to communicate with the information terminal device,
the information terminal device including
a second memory that stores a second information processing program,
a third memory that stores addresses and identification information items of one or more destinations in association with each other, the one or more destinations being selectable as a data-transmission-destination,
a second processor configured to execute the second information processing program, and
a second communication interface configured to communicate with the information processing apparatus, wherein
the second processor of the information terminal device is, when the second processor of the information terminal device executes the second information processing program, configured to
transmit the identification information items of the one or more destinations stored in the third memory to the information processing apparatus via the second communication interface,
the first processor of the information processing apparatus is, when the first processor of the information processing apparatus executes the first information processing program, configured to
receive the identification information items of the one or more destinations from the information terminal device via the first communication interface,
select an identification information item of a destination, to which data is to be transmitted, out of the received identification information items of the one or more destinations, and
transmit the selected identification information item of the destination and the data to the information terminal device via the first communication interface, and
the second processor of the information terminal device is, when the second processor of the information terminal device executes the second information processing program, further configured to receive the identification information item of the destination and the data from the information processing apparatus via the second communication interface, and transmit the data to an address of the destination stored in the third memory in association with the received identification information item via the second communication interface, wherein the information processing apparatus avoids to store and receive the address of the data-transmission-destination, and avoids to transmit the data to the address of the data-transmission-destination.

2. The information processing system according to claim 1, wherein the information processing apparatus further includes a display device, the second memory of the information terminal device further stores profile information about the information processing apparatus, the second processor of the information terminal device is, when the second processor of the information terminal device executes the second information processing program, further configured to transmit the profile information stored in the second memory to the information processing apparatus via the second communication interface, and the first processor of the information processing apparatus is, when the first processor of the information processing apparatus executes the first information processing program, further configured to receive the profile information from the information terminal device via the first communication interface, and display a GUI configured to input a command to transmit the data to the display device of the information processing apparatus depending on the received profile information.

3. The information processing system according to claim 2, wherein the second processor of the information terminal device is, when the second processor of the information terminal device executes the second information processing program, further configured to transmit identification information of the information terminal device to the information processing apparatus, the first processor of the information processing apparatus is, when the first processor of the information processing apparatus executes the first information processing program, further configured to receive the identification information of the information terminal device from the information terminal device, authenticate the information terminal device identified by the received identification information, and transmit an authentication notification to the information terminal device, and the second processor of the information terminal device is, when the second processor of the information terminal device executes the second information processing program, further configured to when the second processor of the information terminal device receives the authentication notification from the information processing apparatus, transmit the profile information stored in the second memory to the information processing apparatus via the second communication interface.

4. An information processing apparatus, comprising:

a first memory that stores a first information processing program;

a first processor configured to execute the first information processing program; and a first communication interface configured to communicate with the information terminal device, wherein the first processor is, when the first processor executes the first information processing program, configured to receive the identification information items of the one or more destinations from an information terminal device via the first communication interface, the information terminal device storing addresses and identification information items of one or more destinations in association with each other, the one or more destinations being selectable as a data-transmission-destination, select an identification information item of a destination, to which data is to be transmitted, out of the received identification information items of the one or more destinations, and transmit the selected identification information item of the destination and the data to the information terminal device via the first communication interface, wherein the information processing apparatus avoids to store and receive the address of the data-transmission-destination, and avoids to transmit the data to the address of the data-transmission-destination.

5. The information processing apparatus according to claim 4, further comprising:

a display device, wherein the first processor is, when the first processor executes the first information processing program, further configured to receive the profile information from the information terminal device via the first communication interface, the information terminal device further storing profile information about the information processing apparatus, and display a GUI configured to input a command to transmit the data to the display device of the information processing apparatus depending on the received profile information.

6. The information processing apparatus according to claim 5, wherein the first processor is, when the first processor executes the first information processing program, further configured to receive the identification information of the information terminal device from the information terminal device, authenticate the information terminal device identified by the received identification information, and transmit an authentication notification to the information terminal device.

7. An information terminal device, comprising:

a second memory that stores a second information processing program;

a third memory that stores addresses and identification information items of one or more destinations in association with each other, the one or more destinations being selectable as a data-transmission-destination;

a second processor configured to execute the second information processing program; and a second communication interface configured to communicate with the information processing apparatus, wherein the second processor is, when the second processor executes the second information processing program, configured to transmit the identification information items of the one or more destinations stored in the third memory to the information processing apparatus via the second communication interface, receive the identification information item of the destination selected by the information processing apparatus and the data from the information processing apparatus via the second communication interface, and transmit the data to an address of the destination stored in the third memory in association with the received identification information item via the second communication interface, wherein the information processing apparatus avoids to store and receive the address of the data-transmission-destination, and avoids to transmit the data to the address of the data-transmission-destination.

8. The information terminal device according to claim 7, wherein the second memory further stores profile information about the information processing apparatus, the second processor is, when the second processor executes the second information processing program, further configured to transmit the profile information stored in the second memory to the information processing apparatus via the second communication interface.

9. The information terminal device according to claim 8, wherein the second processor is, when the second processor executes the second information processing program, further configured to transmit identification information of the information terminal device to the information processing apparatus, and when the second processor of the information terminal device receives the authentication notification from the information processing apparatus, transmit the profile information stored in the second memory to the information processing apparatus via the second communication interface.

* * * * *